Dec. 5, 1950　　A. G. McNISH ET AL　　2,533,029
ODOGRAPH

Filed June 12, 1944　　11 Sheets-Sheet 1

Fig.1.

Inventors
Alvin G. McNish
Bryant Tuckerman

Attorneys

Dec. 5, 1950  A. G. McNISH ET AL  2,533,029
ODOGRAPH
Filed June 12, 1944  11 Sheets-Sheet 2

Fig.2.

Inventors
Alvin G. McNish
Bryant Tuckerman

By [signatures]

Attorneys

Dec. 5, 1950  A. G. McNISH ET AL  2,533,029
ODOGRAPH
Filed June 12, 1944  11 Sheets-Sheet 3

Inventors
Alvin G. McNish
Bryant Tuckerman
By
Attorneys

Dec. 5, 1950 A. G. McNISH ET AL 2,533,029
ODOGRAPH
Filed June 12, 1944 11 Sheets-Sheet 4

Fig. 6.

Inventors
Alvin G. McNish
Bryant Tuckerman
By
Attorneys

Dec. 5, 1950   A. G. McNISH ET AL   2,533,029
ODOGRAPH
Filed June 12, 1944   11 Sheets-Sheet 6

Fig. 8.

Inventors
Alvin G. McNish
Bryant Tuckerman

By
Attorneys

Fig. 10.

Dec. 5, 1950 A. G. McNISH ET AL 2,533,029
ODOGRAPH
Filed June 12, 1944 11 Sheets-Sheet 11

Fig. 15.

Inventors
Alvin G. McNish
Bryant Tuckerman
By Francis P. Vanderwerken and
Joseph H. Brown
Attorneys Patented Dec. 5, 1950

2,533,029

UNITED STATES PATENT OFFICE 2,533,029

ODOGRAPH

Alvin G. McNish, Chevy Chase, Md., and Bryant Tuckerman, Yellow Springs, Ohio, assignors to the United States of America as represented by the Secretary of War Application June 12, 1944, Serial No. 539,940

7 Claims. (Cl. 346—108)

This invention relates to the plotting or indication of courses and distances traveled by moving vehicles (which term is intended to include vehicles in the most general sense); and more particularly to odographs which automatically record these functions. To the accomplishment of this end it is sufficient to measure, in continuous manner, the:

Magnetic heading of the vehicle,
Distance traveled,
Displacement of the vehicle north or south of the initial point,
Displacement of the vehicle east or west of the initial point, and record the two latter quantities.

It is recognized that numerous mechanisms have been devised for the attainment of the foregoing, but so far as we are aware none have heretofore been entirely successful. Some of the mechanisms of the prior art produce results which are too inaccurate for practical purposes while others are entirely too complicated from both operational and maintenance viewpoints.

For a number of years, odographs have been employed on large marine vessels; and these usually employ gyroscopic compasses. Such apparatus has been satisfactory only to a quite limited extent, failing in one way or another to record the data in the most usable form. In addition, such apparatus are characterized by extreme high cost of manufacture and installation; and are so intricate and delicate in construction as to require the attention of a highly skilled attendant and/or operator. Further, such apparatus is usually extremely heavy and for this reason is impractical or undesirable for use on small vehicles, such as light vessels, automobiles, aeroplanes, etc.

It is among the objects of the present invention to eliminate the foregoing difficulties by providing an efficient odograph which is relatively inexpensive as to both initial cost and upkeep.

Another object is the provision of an apparatus of the class described which is sufficiently light and compact as to render itself practical and useful on small vehicles such as those previously mentioned.

The invention, then, comprises the features hereafter fully described, and as particularly pointed out in the claims, the following description and the annexed drawings setting forth in detail a certain illustrative embodiment of the invention, this being indicative of but one of a number of ways in which the principle of the invention may be employed.

The apparatus of the present invention may be considered as falling into three general categories: (1) a directive mechanism which includes a compass element and provides a fixed or cardinal reference-direction; (2) an odometer or distance-measuring mechanism which is moved by an amount which is proportional to the actual distance traveled, and (3) an integrating mechanism which provides for the resolution of the direction of motion into components, one parallel to, and one perpendicular to, the reference-direction. Thus, the position of the stylus on the odograph map is controlled by two perpendicular movements, one of which is proportional to the sum of all of the north and south components of motion of the vehicle, and the other to the sum of all of the east and west components. Reference to the three categories or general types of mechanism will be made in the foregoing order.

The directive mechanism

Figure 1:
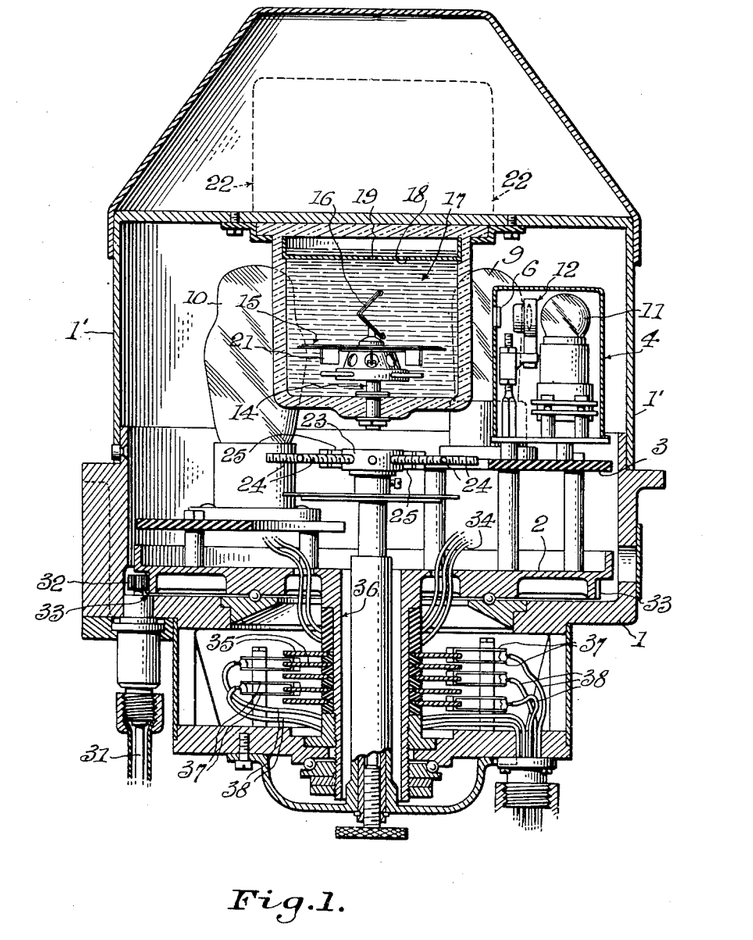
Figure 1 is a vertical elevation, partly in section, of the directive mechanism of the apparatus of the invention; the same including a direction indicator and certain electronic instrumentalities operated thereby.

Referring to Figure 1, the vehicle carries a base member 1 which is adapted to rotatably support a horizontally-disposed circular plate 2.

Mounted on the circular plate 2, and adjacent the periphery thereof, is an elevated platform 3 on which there is disposed a light-housing 4 having vertical convergently disposed side-walls 5, the intersection of the converging ends of the said side-walls being directed at the substantial center or axis of the plate aforesaid. As shown more fully in Figure 2, the apex of the side-walls of the light-housing 4 is provided with a slot 6.

Figure 2:
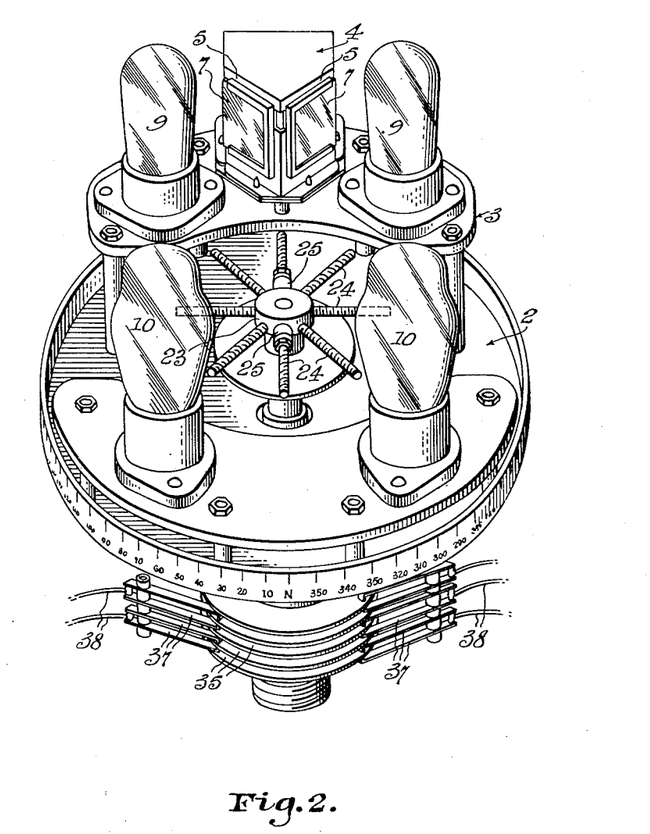
Figure 2 is a perspective of a rotatable, horizontally-disposed circular plate which forms part of the directive mechanism and supports a light source, photoelectric cells operated thereby, and electronic relays operated by the photoelectric cells for performing certain functions the manner and purpose of which will become more apparent as the description proceeds; and of a non-rotatable assembly for compensating quadrantal error of a magnetic compass.

The light-housing 4 carries on each of its vertical side-walls 5 a substantially flat mirror 7; and disposed on the elevated platform 3 adjacent each of the mirrors 7 there is a photoelectric cell, or other light-sensitive element 9.

Mounted on the horizontally-disposed circular plate 2, and operatively associated with each of the photoelectric cells 9 is a thyratron 10, or other relay having a sufficient output of current to control (through suitable electromagnetic switches, or relays, if desired) a power source, such as a small reversible electric motor, which will be later described. A "thyratron" is essentially a hot-cathode, gas tube in which a control grid has been placed between cathode and anode. With the anode at a definite positive potential with respect to the cathode; no current will pass until the grid potential is raised above a certain critical value. When the grid potential is raised to this value, the full current flows. Once the current starts, however, the grid loses control and no longer has any effect on the discharge, regardless of its potential.

Figure 3:
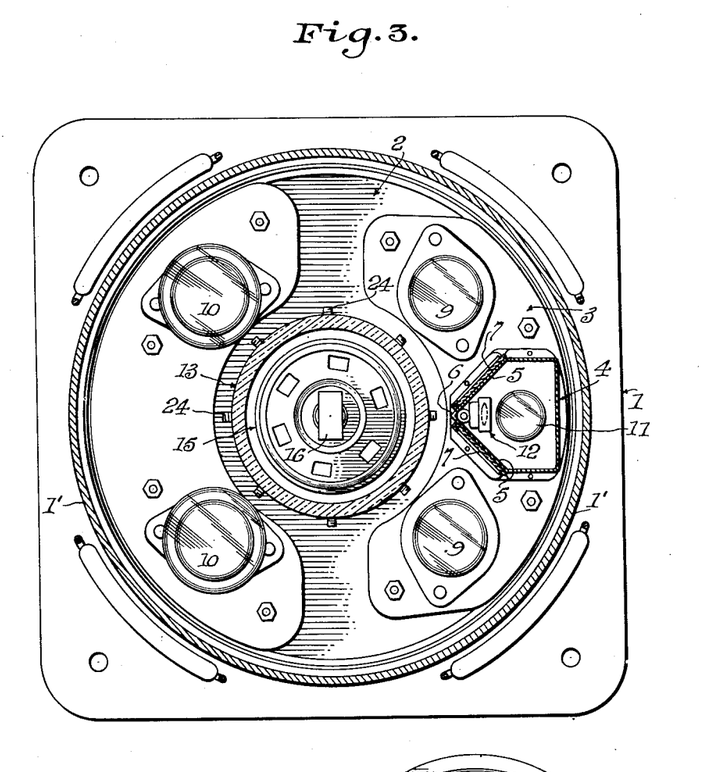
Figure 3 is a plan of the showing of Figure 2, together with the base plate therefor and the magnetic compass element, part of the said showing appearing in section.

As shown more clearly in Figures 1 and 3, the light-housing 4 contains a light-source 11 which is so disposed as to cast a beam of light through the slot 6; and this function is implemented by a lens-system generally designated at 12.

Figure 6:
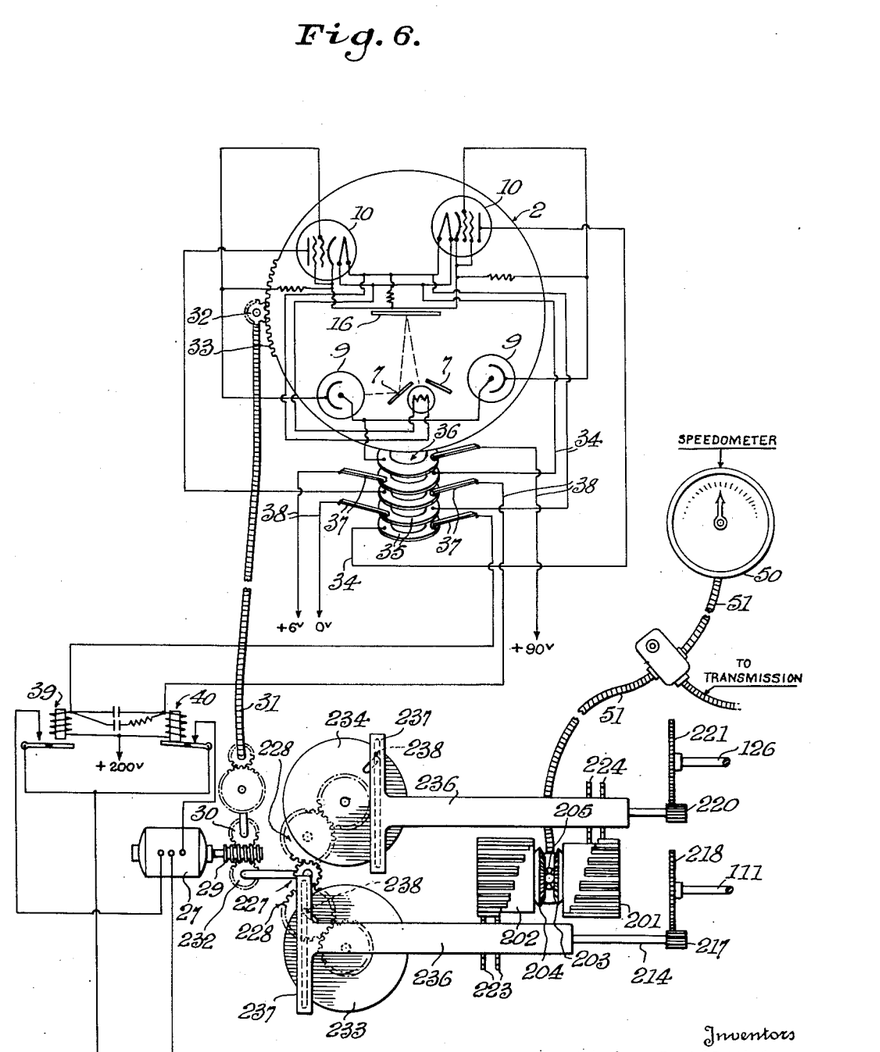
Figure 6 is a schematic view illustrating diagrammatically the directive mechanism and the electronic control system; and showing in functional combination therewith the odometer mechanism and representative portions of the integrating mechanism, the latter being essentially a means for obtaining a motion proportional to the sine or cosine of the angle of azimuth or heading of the vehicle.

From the foregoing it will be perceived that a reflection of the beam of light cast by the light-source 11 from a position adjacent the center of circular plate 2 to either of the mirrors 7 will energize the adjacently disposed photoelectric cell 9 to "fire" its respective thyratron 10, for purposes which will hereinafter become more fully apparent. The circuit shown in Figure 6 is an electronic "follow-up" or "hunting" circuit, i. e., with no grid signal it is stable with either thyratron alone "fired," but not with both or neither "fired"; while a sufficiently positive signal on the grid of the tube which is not "fired" will fire it and return the other tube to the unfired state. Thus even if neither photocell is illuminated, that thyratron will remain "fired" which is associated with the photoelectric cell which last was sufficiently illuminated. As embodied in the apparatus of the present invention, the follow-up circuit controls the rotation of the circular plate 2 in such manner as to perform the following functions: (a) Primarily, it controls "overshooting" by the light of a photoelectric cell so that the system will be driven in the proper direction until the other photoelectric cell is illuminated. (b) It provides a positive means of "hunting" with no possibility of a neutral position. (c) The symmetrical circuit minimizes unbalance due to variation of characteristics of tubes and of mechanical components; and therefore eliminates the balancing of mechanical properties against electrical and optical properties which would be needed in an off-on (unbalanced) or measuring-type circuit, as have been used previous to our invention.

The base member 1 carries a cap 1' which is adapted to inclose the rotatably supported, horizontally disposed circular plate 2. Within this cap 1' and suspended from the top thereof is a magnetic compass generally designated at 13. The vertical axis of the compass 13 is in substantial co-axial alignment with the axis or center of the circular plate 2. The cap 1' is rigidly but removably attached to the base member 1, and the latter is suitably supported against relative movement with respect to the vehicle, whereby neither of these elements is free to rotate with the cirlar plate 2.

Figure 4:
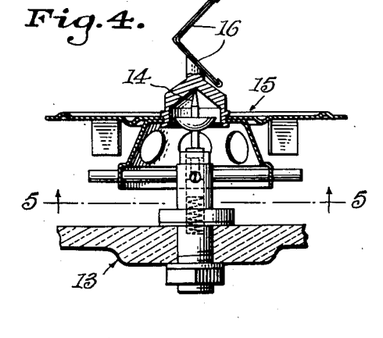
Figure 4 is a fragmentary elevation of the direction indicator, or compass, showing in some detail the construction of the so-called "compass card" or magnetic north-seeking compass element and a light-reflecting element mounted thereon for cooperation with the electronic control system.
Figure 5:
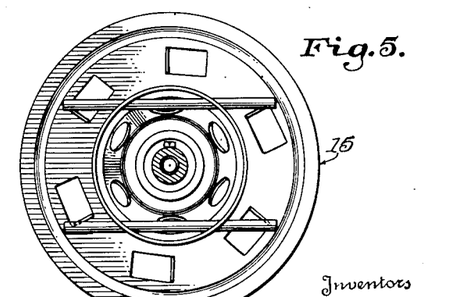
Figure 5 is a view on the line 5—5 of Figure 4.

More specifically, the magnetic compass 13 comprises a vessel of transparent material. Within this vessel, and on the bottom thereof, is a pivot pin 14, which pivotally supports a north-seeking magnetic compass element 15 atop the central portion of which there is mounted a reflecting element 16 comprised of a pair of substantially flat mirrors disposed in abutting relationship and at right angles with respect to each other, the edge or joint between the mirrors occupying a substantially horizontal plane. The mirrors at right angles are intended to reflect light from the compass element in a direction which, when referred to the circular plate 2, depends on the relative orientation of the compass element and of the light source about the vertical axis of the system, but is substantially independent of their orientations about axes at right angles to said vertical axis.

The vessel comprising the magnetic compass 13 also contains a suitable liquid dampener 17, such as kerosene, for aiding the satisfactory operation of the magnetic compass element 15, and preferably, also, a surface baffle-plate 18 having a central aperture 19. A suitable expansion chamber is provided for receiving the overflow of the liquid dampener 17 from the central aperture 19 in the surface baffle-plate 18. This construction and arrangement eliminates air bubbles in the main compartment of the compass vessel. Other, and additional, devices for stabilizing the operation of the magnetic compass element 15 may be employed.

Additional accuracy may be obtained by utilizing devices which compensate for semi-circular and/or quadrantal deviation. To compensate for semi-circular deviation there may be employed in the top of the cap 1' a block 22 (shown in dotted lines in Figure 1) having therein a series of recesses or apertures (not shown) which are adpated to receive magnetized elements (likewise not shown) in different magnetic positions with respect to the axis of the magnetic compass element 15. In addition to, or as a substitute for, the block 22 and the magnetized elements referred to the cap 1' may carry a conventional micrometer-type adjustable compensator (not shown) having one or more magnetized elements which are adapted through suitable gearing for adjustable magnetic disposition with respect to the axis of the magnetic compass element 15.

To compensate for quadrantal deviation, we have successfully employed, at the approximate center of the rotatably supported horizontally-disposed circular plate 2, a collar 23 (Figure 2) of suitable magnetically permeable material, the said collar being provided with radially-extending screws 24 of non-magnetic material, the screws being removable and adapted to carry in likewise removable fashion magnetically permeable elements 25 of requisite size and number.

Referring to the diagram of Figure 6, the numeral 27 designates the small reversible electric motor earlier referred to. Secured to the shaft of this small reversible electric motor 27 is a worm 29 with which there is meshed a worm gear 30. This worm gear is in turn geared to one end of a flexible shaft 31, the other end of the said flexible shaft being secured to a pinion 32 which meshes with a ring gear 33 on the periphery of the rotatably supported, horizontally-disposed circular plate 2. By this means the small reversible electric motor 27 is permitted to rotate the horizontally-disposed circular plate 2.

As before stated, the small reversible electric motor 27 is actuated through the thyratrons 10 which are "fired" by the photo-electric cells 9 to which they are connected by a suitable circuit. The thyratrons 10 are electrically connected as by the wiring 34 to a series of collector rings 35 mounted on a spindle 36 which is secured to and depends from the center of the rotatably-supported, horizontally-disposed circular plate 2. Engaging the collector rings 35 is a corresponding series of brushes 37. These brushes 37 are electrically connected with the small reversible electric motor 27 through a circuit which includes magnetic clutches or relays 39 and 40 for effecting the reversal of direction.

In the operation of the vehicle, a change of direction thereof will cause the rotative movement of the compass vessel 13 with respect to the north-seeking magnetic compass element 15. Initially, the rotatably-supported, horizontally-disposed circular plate 2 will, along with the compass vessel 13, tend to move with respect to the north-seeking magnetic compass element 15. The teachings of the present invention comprehend the movement of the circular plate 2 (and the instrumentalities carried thereby) in such a manner as to compensate for the aforesaid tendency. That is to say, the present invention provides for the constant "hunting" on the part of the circular plate 2 of a neutral position with respect to the light-rays which are reflected by the reflecting element 16 atop the north-seeking magnetic compass element 15. This neutral position must necessarily be one wherein neither of the mirrors 7 (and accordingly the adjacently disposed, and respectively actuated, photoelectric cells 9) receives light-rays which are reflected from the reflecting element 16. In other words, the circular plate 2 will be rotated through an arc equal to that through which the compass vessel 13 swings, but in the opposite direction. Thus, the rotatably-supported, horizontally-disposed circular plate 2 is made to continually oscillate or "hunt" the neutral position referred to. This continual oscillation provides certain advantages over an arrangement whereby the follower would move only when the north-seeking compass element itself takes up a new position. One advantage is that any effects of back-lash wherever located are very effectively eliminated by the "hunting." In addition, there are certain mechanical details in connection with the integrating mechanism which makes this "hunting" principle highly efficient for interpolating motions between relatively large discrete steps.

Since power is derived from the small reversible electric motor 27 and the associated magnetic clutches or relays 39 and 40 (for effecting the reversal of direction), the torque available to rotate the circular plate 2 (and the instrumentalities carried thereby) and the integrating mechanism is limited only by the design of the mechanical system; and does not in any way disturb the north-seeking compass element 15 as its only connection to the mechanical and electrical instrumentalities is through the beam of light reflected from the mirrors 16.

*The odometer mechanism*

This mechanism measures the distance actually traveled by the vehicle and in the case of a land vehicle may merely take the form of a suitable power connection from the transmission of the vehicle or other means providing a rotation substantially proportional to the motion of the vehicle. The power connection illustrated at 51 as comprising a flexible shaft, is connected to the integrating mechanism in a manner which will appear more fully hereinafter.

*The integrating mechanism*

The function of the integrating mechanism is to combine the information supplied by the odometer mechanism and by the directive mechanism in such manner that the motion is separated into north-south and east-west components. In other words, the integrating mechanism performs the mathematical operation of adding up the components of S cosine $a$ and S sine $a$ where S is the distance traveled and $a$ is the angle of azimuth, or heading, with respect to the reference-direction, (north) maintained by the compass element.

It is among the teachings of the present invention to obtain a motion proportional to the sine or cosine of the angle of azimuth or heading by the use of a mechanism including a pair of "Scotch-yokes." The position of the bar of each of these "Scotch-yokes" is directly proportional to the sine of the angle of position of the disc carrying the pin, which will hereinafter be referred to as the "sine-disc." The pin on a second "sine-disc" is disposed at an angle of 90° with respect to the pin of the first-named sine-disc, and operates in corresponding manner; wherefore it is evident that this second Scotch-yoke will have a position directly proportional to the cosine of the angle of position of the disc carrying its pin. In a manner which will appear more fully hereinafter, means are provided by which the rotary motion of the odometer is variably coupled to driven elements with the degree of coupling proportional to the positions of the Scotch-yokes, whereby the motion of the driven elements will then be proportional to the amount of travel of the vehicle multiplied by the sine and by the cosine of the angles of the sine-discs; and the positions of the sine-discs are controlled by the compass, whereupon the motion of the driven elements is proportional to the motion of the vehicle times the sine (or cosine) of the angle of azimuth, or heading.

Figure 7:
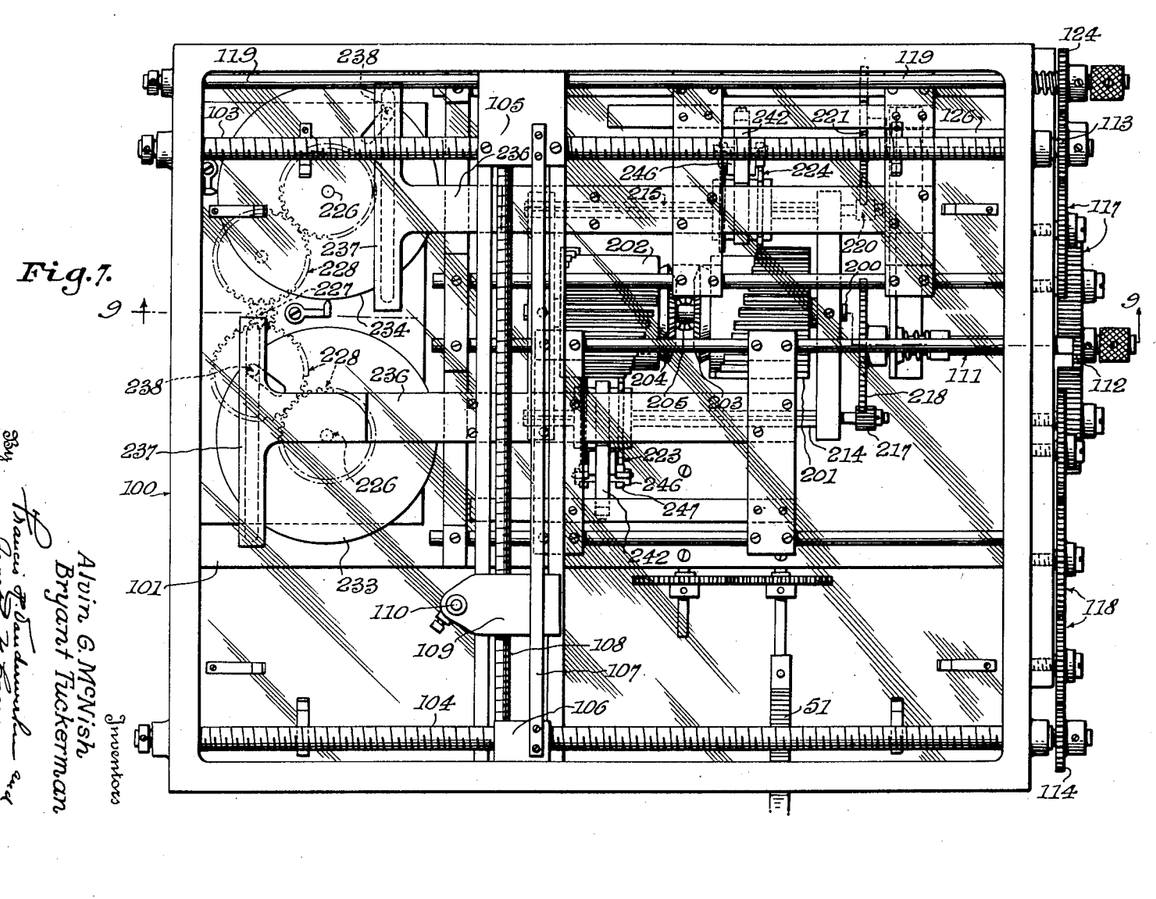
Figure 7 is a plan of the integrating mechanism showing the scribing surface, or table portion, over which the recording stylus is moved, as composed of a transparent material.
Figure 8:
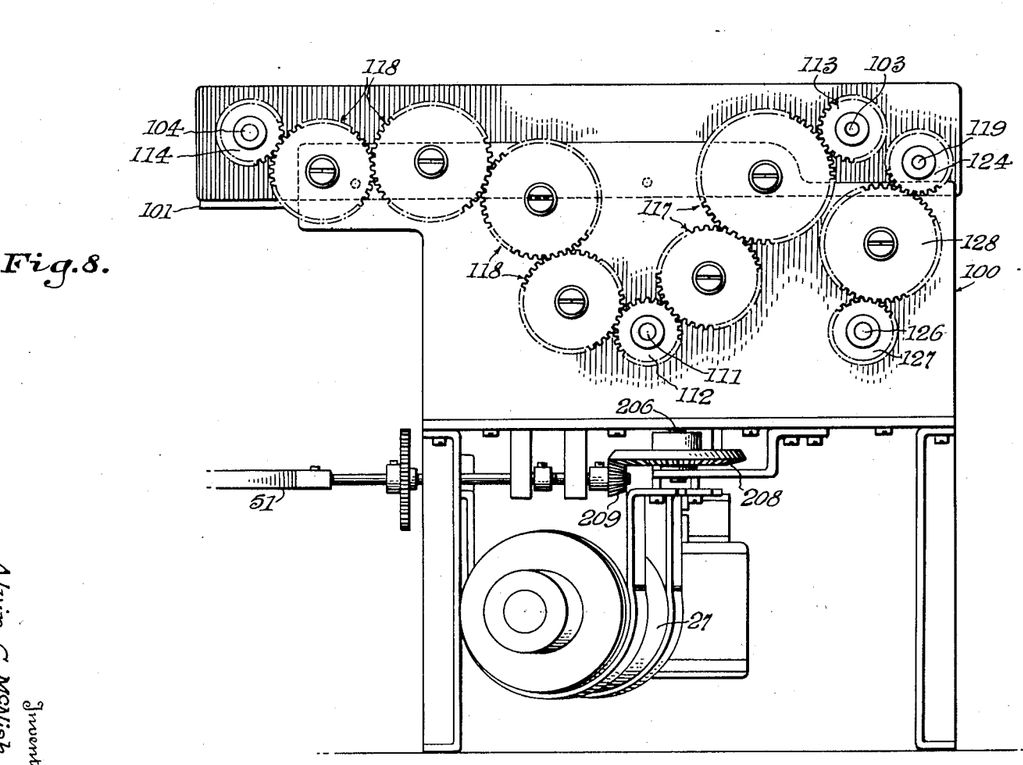
Figure 8 is an end view of the showing of Figure 7.

More specifically, the integrating mechanism comprises a frame 100 which affords a substantially flat scribing surface or table portion 101, shown in the present instance as composed of a transparent material. Rotatably mounted on the frame 100 and extending along two of the parallel edges of the scribing surface 101 is a pair of parallel correspondingly threaded lead-screws 103 and 104, each of which carries a travelling nut as at 105 and 106, respectively, the same being connected by a rod 107. Between the lead-screws 103 and 104 there is supported and journaled a lead-screw 108. Carried by the lead-screw 108, and in threaded engagement therewith, is a travelling nut 109 which carries a stylus generally designated at 110.

The frame 100 rotatably supports a centrally-disposed longitudinally-extending shaft 111, one end of which extends outboard and has secured thereto a gear 112. A similar gear is secured to the corresponding end of each of the lead-screws 103 and 104, the same being shown at 113 and 114, respectively. The gear 112 drives the gears 113 and 114 through gear trains 117 and 118, respectively.

Disposed slightly below the lead-screw 103, and in parallelism therewith, is a horizontally-extending splined shaft 119 which is rotatably supported by the frame 100. This splined shaft 119 slidably carries in splined relationship a bevel gear 121. Secured to one end of the lead-screw 108 is a bevel gear 122 which meshes with and receives rotation from the bevel gear 121 on the splined shaft 119.

Secured to the end of the horizontally-extending splined shaft 119 which is adjacent the gear 113 (on the lead-screw 103) is a gear 124. The frame 100 rotatably supports a longitudinally-extending shaft 126, one end of which extends outboard and has secured thereto a gear 127 which is adjacent the gear 124 (on the splined shaft 119) and is connected therewith by means of a large idler gear 128.

The coordinated rotation of the longitudinally-extending shafts 111 and 126 in such manner as to coincide with the north-south and east-west movements of the vehicle (as represented by rotation of the odometer shaft in proportion to the motion of the vehicle and by changes in the position of the rotatably-supported, horizontally-disposed circular plate 2 to compensate for changes in the direction of the movement of the vehicle with respect to the north-seeking magnetic compass element 15) must result in the coordinated movement of the stylus 110 to reproduce the path of travel of the vehicle on a map or the like which may be placed on the scribing surface or table 101 of the frame 100.

Figure 10:
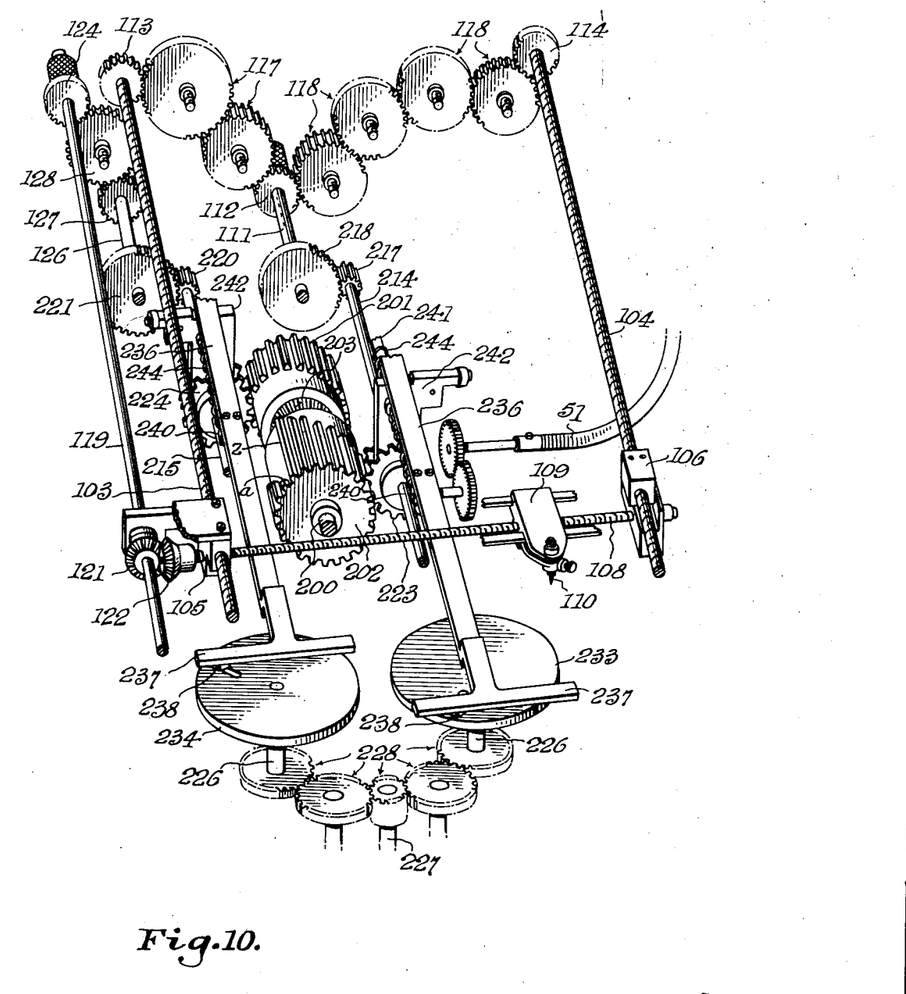
Figure 10 is a perspective view showing in functional combination representative portions of the integrating mechanism.
Figure 11:
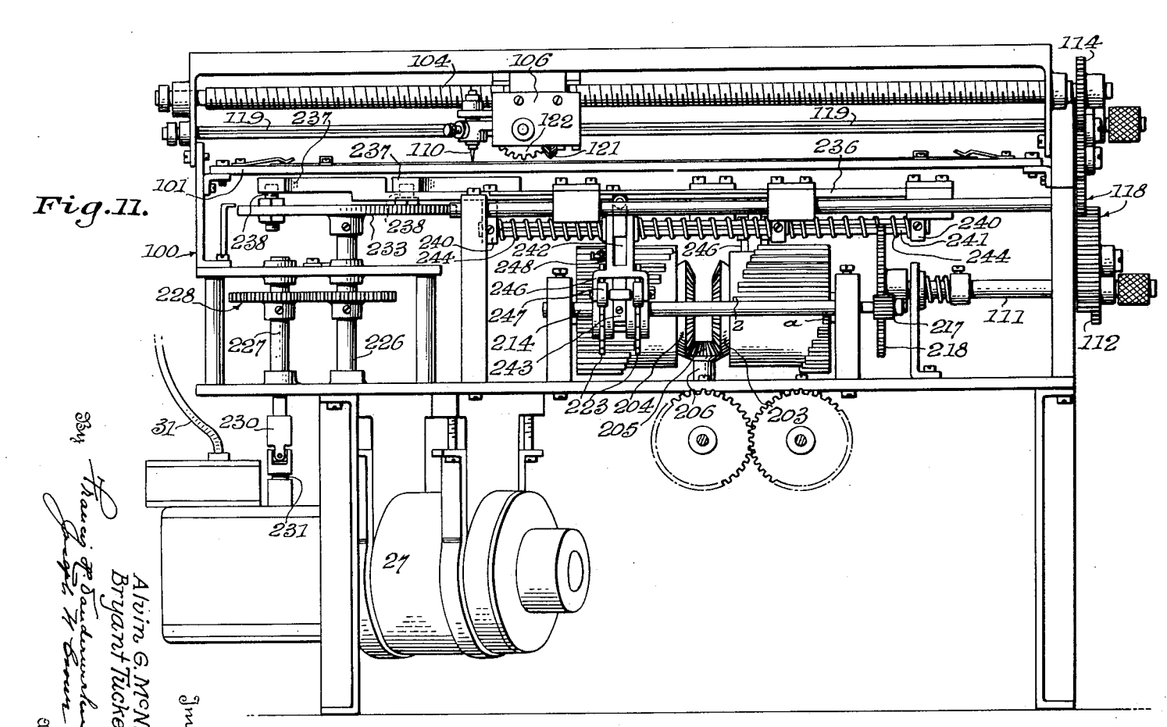
Figure 11 is a side view of the showing of Figure 7.
Figures 12, 13, 14:
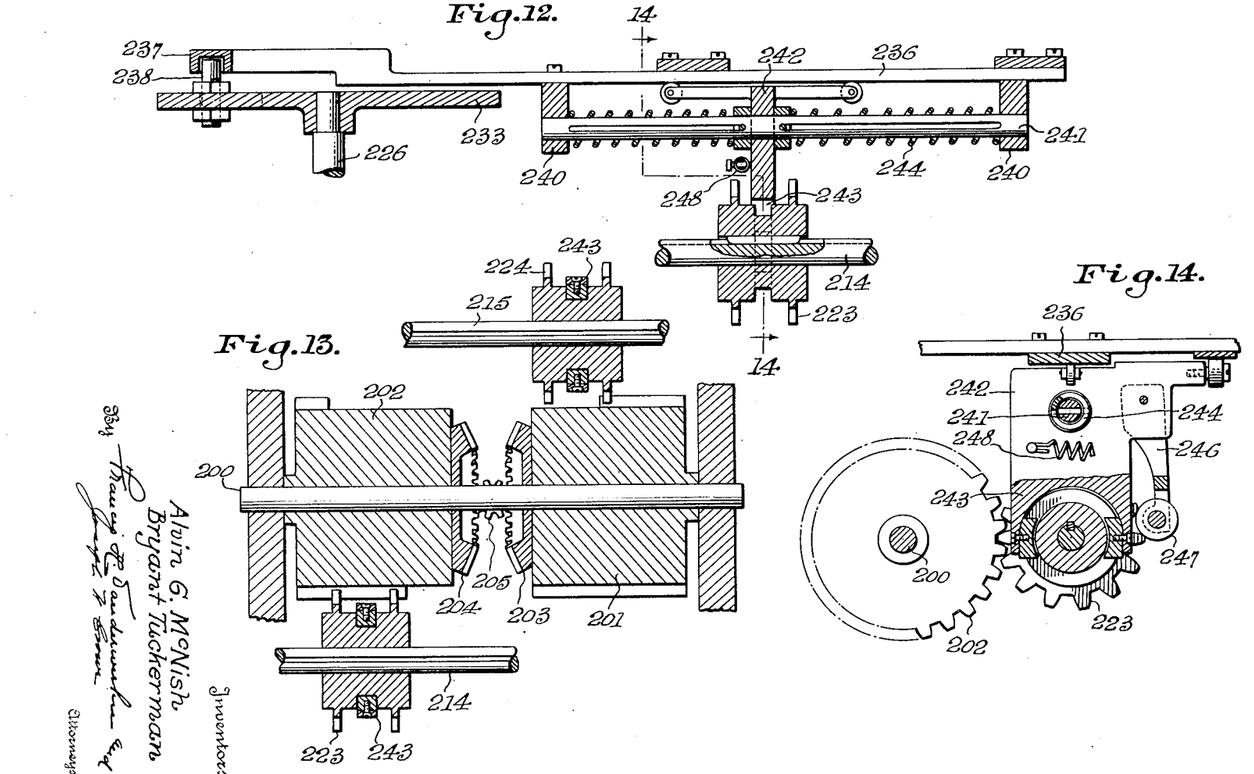
Figures 12 and 13 are respectively an enlarged vertical section and an enlarged horizontal section of certain details of the integrating mechanism.
Figure 14 is an elevational view of the line 14—14 of Figure 12.
Figure 15:
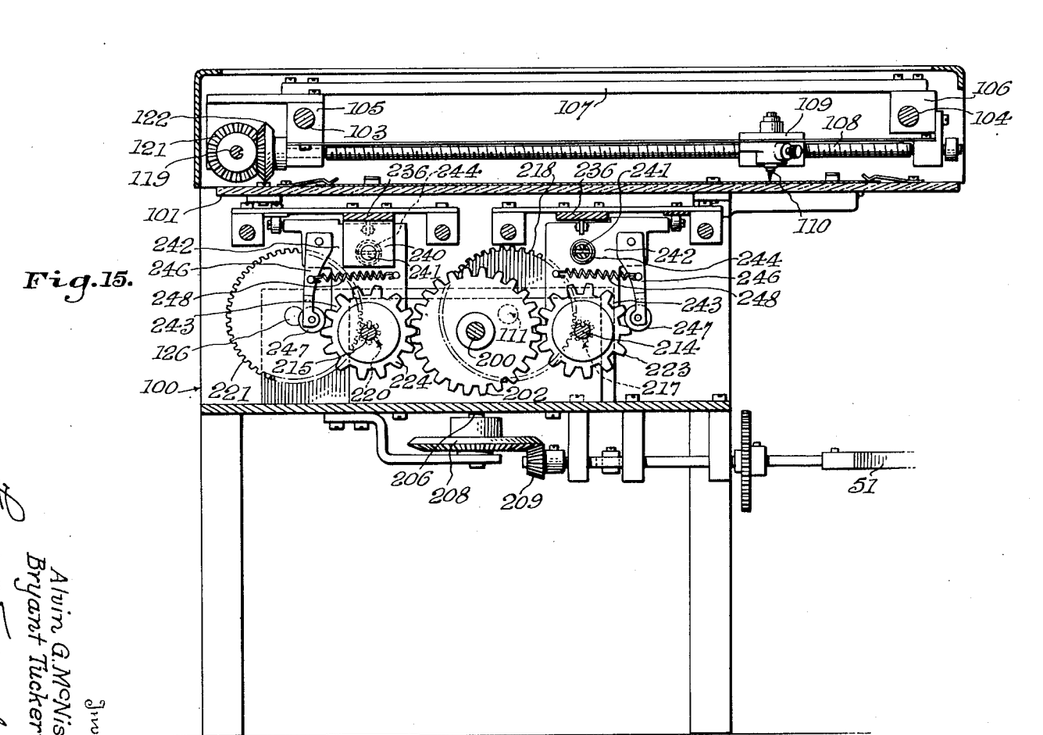
Figure 15 is an elevational view on the line 15—15 of Figure 9.

Mounted on the frame 100 is a horizontal shaft 200 which extends in parallelism with the longitudinally-extending shafts 111 and 126. This shaft 200 carries a pair of spaced-apart rotatable step-gears 201 and 202, the teeth of which extend longitudinally and progressively increase in length, the shortest tooth of each of the said step-gears being designated by the letter "a" and the longest tooth thereof by the letter "z." The ends of the teeth of each step-gear thus form a one-turn spiral. It is to be noted that in construction the step-gears 201 and 202 are identical but that their positions are so reversed with respect to each other as to provide for the progressive increase in the length of their teeth from their remote ends inwardly. On their inner (and therefore adjacent) ends the step-gears 201 and 202 carry opposed ring-gears, the same being respectively designated at 203 and 204. These ring-gears 203 and 204 are simultaneously, and oppositely, driven by an intermediately disposed pinion 205 which is secured to the upper end of a rotatable vertical shaft 206. The lower end of the rotatable vertical shaft 206 carries a ring-gear 208, which is driven by a pinion 209 which is connected to, and receives rotation from, the flexible cable 51 of the odometer mechanism, earlier described. According to the foregoing construction and arrangement, the step-gears 201 and 202 are constantly rotated at a speed correlated with the speed of the vehicle.

Mounted on each side of the horizontal shaft 200 which carries the step-gears 201 and 202 is a parallel splined shaft, the same being respectively designated at 214 and 215. The shaft 214 has secured thereto a small gear 217 which meshes with a large gear 218 on the longitudinally-extending shaft 111; and the shaft 215 carries for rotation therewith a small gear 220 which meshes with a large gear 221 on the longitudinally-extending shaft 126.

From the foregoing, it will be apparent that rotation receiving instrumentalities (to be later described) may be so adjustably disposed along the lengths of the parallel splined shafts 214 and 215, and correspondingly the step-gears 201 and 202, as to receive from the latter rotation of varying extent and direction; and that this rotative movement may be imparted to the longitudinally-extending shafts 111 and 126 for the purpose of moving the stylus 110 in the manner hereinbefore described. For receiving the rotation of the step-gears (201 and 202), each of the splined shafts 214 and 215 may carry, in splined relationship, a slidable gear, as shown at 223 and 224, respectively.

In order that the longitudinally-extending shafts 111 and 126 be coordinately rotated only to the extent necessary to properly move the stylus 110 in accordance with the direction of travel of the vehicle, it is necessary that the rotation-receiving instrumentalities 223 and 224 (hereinafter referred to as the "pick-up gears") be slid along their respective splined shafts 214 and 215 in coordination with the movement of the rotatably-supported, horizontally-disposed circular plate 2 as it "hunts" a neutral position with respect to the north-seeking magnetic compass element 15. For this purpose there are provided the Scotch-yokes previously discussed and connecting means therefor which will be described immediately hereinafter.

Figure 9:
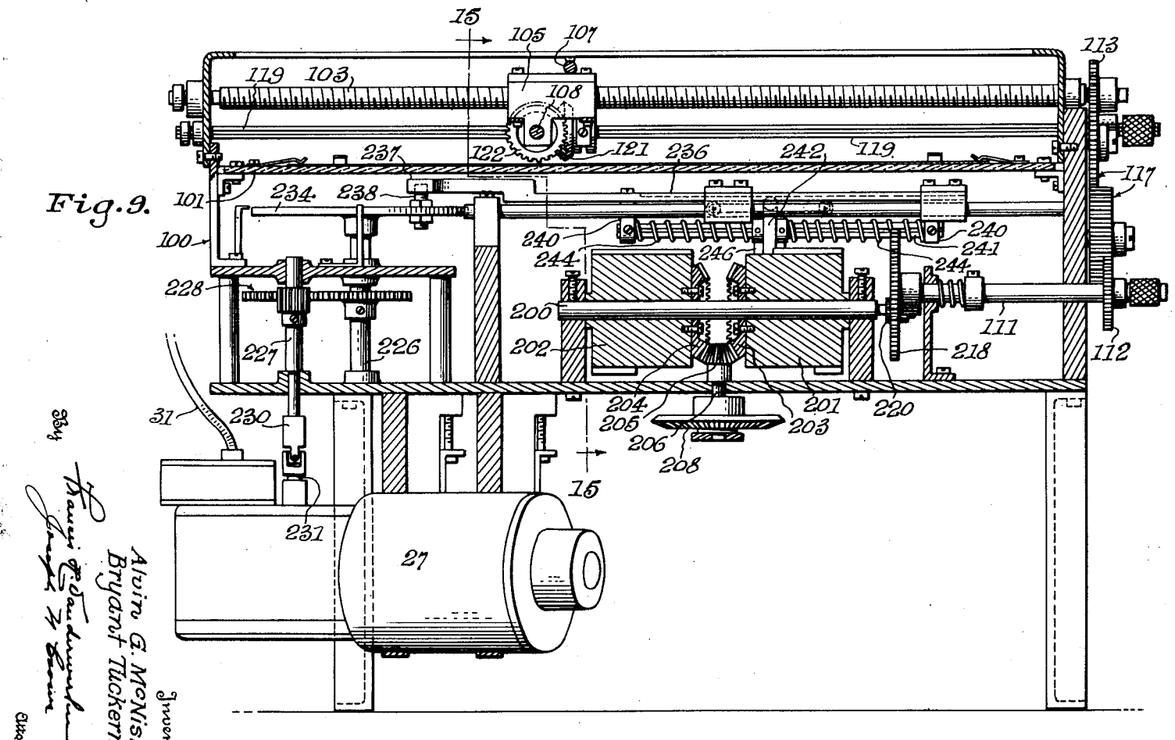
Figure 9 is a view on the line 9—9 of Figure 7 and showing in some detail the instrumentalities which resolve the direction of motion into components, one parallel to, and one perpendicular to, the reference-direction.

Disposed in spaced relation with respect to the splined shafts 214 and 215 is a pair of parallel vertical rotatable shafts, the same being commonly designated at 226. Each of these vertical rotatable shafts 226 is driven from a shaft 227 through a suitable gear train generally designated at 228. This shaft 227 is connected, through a coupling 230 with a shaft 231 (Fig. 9) having secured thereto a worm gear 232 (Fig. 6). This worm gear 232 meshes with the worm 29 which, as before stated, is driven by the small reversible electric motor 27.

Secured to the top of each of the parallel vertical rotatable shafts 226 is a horizontally-disposed sine-disc, the same being designated at 233 and 234. Above each of the splined shafts 214 and 215 is a slide bar 236 which is suitably mounted on the frame 100 for longitudinally sliding movement.

Carried by each of the slide bars 236 is a yoke 237 which is pivotally connected to the adjacent sine-disc (233 or 234) by means of a pin 238. The points of connection between the yoke 237 and the sine-discs are offset and normally 90° out of phase; and the partial rotation of the shaft 227 will cause associated longitudinal sliding movement of the slide bars 236.

In order to operatively connect the slide bars 236 with the pick-up gears 223 and 224 (which are slidably mounted on the splined shafts 214 and 215 respectively), each of the slide bars carries a pair of depending longitudinally-spaced hangers 240 between each pair of which there is fixed a longitudinally-extending rod 241. Slidably mounted on each of the rods 241 is a slide block 242, the lower portion of which forms a yoke 243 which is connected to the most adjacent of the pick-up gears 223 and 224; and the latter of which are, as before stated, slidably mounted on the splined shafts 214 and 215, respectively. In the illustrative embodiment the pick-up gears 223 and 224 are transversely divided by a bearing portion which their respective yokes 243 embrace in suitable manner, whereby each of the said pick-up gears comprises a transversely separated pair of toothed sections; but it will be readily understood that various equivalents may be substituted therefor.

Each of the rods 241 carries a pair of helical compression springs 244 one being disposed on either side of the slide-block 242. The function of this spring arrangement is to prevent interference between the pick-up gears and the step-gears due to an attempt to mesh them when their teeth are not properly lined up, and to assist the initial sliding of the pick-up gears (223 and 224) into mesh with the teeth of the step-gears companied by the compression of one of the (201 and 202), any resistance thereto being accompanied by the compression of one of the springs 244 to accommodate the further movement of the rods 241 (by which the said springs and the slide blocks 242 are carried) until such time as proper tooth alignment may be effected.

To further assist the proper functioning of the pick-up gears 223 and 224 (and, more specifically, to prevent their excessive rotative movement) the slide blocks 242 may be provided with suitable pawling devices. These may conveniently take the form of pivotally-mounted yokes 246 which depend from slide blocks 242 and carry in axially-aligned, but spaced, relationship a pair of rollers 247 for engaging the side walls of adjacent teeth of the transversely separated pair of tooth sections of the pick-up gears. These pivotally-mounted yokes 246 (and, accordingly, the axially-aligned spaced rollers 247) are resiliently maintained in operative position by means of tension springs 248, or equivalent devices.

As before stated, the length of the gear teeth of the oppositely-rotating step-gears 201 and 202 increase or decrease as determined by the direction of rotation of the vertical shaft 206 which is driven in accordance with the forward speed of the vehicle through the medium of the flexible shaft 51. The pick-up gears 223 and 224 may obtain rotation from either of the step-gears 201 and 202; either of the pick-up gears may be moved into "idle" (or intermediate) position; and both of the pick-up gears may be receiving rotation at the same time (from the same or different pick-up gears). However, in no case will both of the pick-up gears be idle throughout a complete revolution thereof, although both of the said gears may be idle for a portion of a revolution. Thus, the pick-up gears 223 and 224 assume positions on their respective splined shafts 214 and 215 which are proportionate to the cosine and sine of the heading of the vehicle from magnetic north; and the total rotative movement of the pick-up gears is proportionate to the product of the distance traveled by the vehicle multiplied by the cosine or sine of direction of travel (i. e., the distance along the north axis for the pick-up gear 223 and the distance along the east axis for the pick-up gear 224). The degree of coupling between the step-gears (201 and 202) and gears (223 and 224) varies by discrete steps according to the number of teeth being used on the step-gears.

The oscillation of the circular plate 2 serves to interpolate accurately between the integral number of teeth of the step-gears (201 and 202) so that the average rotation of each of the pick-up gears (223 and 224) is proportional to the whole number of teeth plus a fractional number, to give the proper fraction so that the correct rotation of the pick-up gears results. In using any method of integration in which the integrand is varied by discrete steps (as for example, by means of the step-gears of the illustrative embodiment) the accuracy is usually limited by the number of steps. For example if there are twenty-five teeth, the accuracy is limited to the nearest four per cent, i. e., to ±2 per cent. The effect of the "hunting" principle is to theoretically reduce this error to a negligible quantity by making a finite number of teeth equivalent in accuracy to an infinite number of teeth. A blind spot between the photoelectric cells 9 may satisfactorily produce an approximate 10° "hunt" on the part of the circular plate 2; and the frequency of oscillation or "hunting" may acceptably approximate seventy-five cycles per minute.

The construction and mode of operation of the reflecting element 16 are of considerable importance. When a mirror is placed on the compass card (i. e., compass element 15) of an optical system, for measuring azimuth, the direction of the emergent ray (for a given position of the remaining optical system) varies not only in azimuth but also in elevation due to tilting of the vehicle. This causes difficulty in maintaining the reflected ray in the plane of the light-sensitive elements. According to applicant's construction two mirrors intersect at a fixed angle $k$, and a light ray is reflected successively from the first and then the second, the relative directions of the incident and emergent rays being characterized as follows: (a) They lie in planes parallel to the intersection of the mirrors, which planes make an angle $2k-180°$ with each other (hence, if $k=90°$ they are parallel); and (b) the angles made by each with lines parallel to the intersection of the mirrors are equal. Under the operating conditions in which the magnetic compass element 15 moves angularly relative to the incident light ray, (b) provides the desired dependence of the direction of the emergent ray upon the azimuth of the magnetic compass element, while (a) limits the movement of the emergent ray in a vertical direction. It is most efficient to assemble the mirrors at approximate right angles. In such case the emergent and incident rays lie in parallel planes parallel to the intersection of the mirrors (regardless of which mirror is first struck by the light). Since the "hunting" system permits only a small azimuthal displacement of the mirrors with respect to the optical system, the direction of the emergent rays is permitted only a small variation in a vertical direction due to the tilting of the magnetic compass element. By this means the direction of the emergent ray relative to the optical system is confined to a small region which cannot be crossed without illuminating the light-sensitive elements (i. e., photoelectric cells 9).

In the manner described earlier herein, the pick-up gear 223 controls the extent and direction of rotation of the lead-screws 103 and 104; and the pick-up gear 224 controls the extent and direction of rotation of the lead-screw 108; with the result that the stylus 110 is moved longitudinally and transversely of the map or other record on the scribing surface or table 101, the said movement being in accordance with the course and distance traveled by the vehicle.

It will be understood that the pitch of the threads of the lead-screws 103—104 and 108 may be varied to change the scale of the course and distance charted; and the same effect may be produced by changing driving ratios at numerous points in the mechanisms which drive the said lead-screws. Accordingly, the teachings of the present invention include the addition and substitution of known mechanical and/or electrical expedients for effecting desired changes to suit specific conditions, but as such these form no part of the invention and are therefore neither shown nor described.

Other modes of applying the principles of the invention may be employed, changes being made as regards the details described, providing the features stated in any of the following claims, or the equivalent of such, be employed.

Having thus described our invention, what we claim as new and wish to secure by Letters Patent is:

1. An apparatus for plotting the course and distance traveled by a moving vehicle comprising stylus-operating instrumentalities, an odometer shaft adapted to drive said stylus-operating instrumentalities at variable speeds, a pair of aligned step-gears interposed between said odometer shaft and said stylus-operating instrumentalities, pick-up means engaging the step-gears and operable to transmit motion from the latter to said stylus-operating instrumentalities, a compass for controlling the stylus operating instrumentalities Scotch-yoke mechanism for moving said pick-up means parallel to the axis of the aligned step-gears and into positions which are operatively proportional to the sine or cosine of the angle of deviation of the moving vehicle from the compass heading, a support adapted for rotative movement about the axis of said compass, a light source mounted on the support adjacent the compass and a light-sensitive cell mounted on said support, means for shielding the cell to prevent direct illumination of the cell from the light source, means carried by said compass for reflecting light from said light source onto said light-sensitive cell, and means controlled by the reflected light on said light-sensitive cell for rotating said support about the axis of said compass in a direction and degree opposite to and compensating for the deviation of the moving vehicle from the compass heading.

2. An apparatus for plotting the course and distance traveled by a moving vehicle comprising stylus-operating instrumentalities, an odometer shaft adapted to drive said stylus-operating instrumentalities at variable speeds, a pair of aligned step-gears interposed between the odometer shaft and the said stylus-operating instrumentalities, oppositely movable slidably mounted gears for transmitting motion from the step-gears to said stylus-operating instrumentalities, Scotch-yoke mechanism for moving said slidably mounted gears parallel to the axis of the aligned step-gears and into positions which are operatively proportional to the sine or cosine of the angle of deviation of the moving vehicle from the compass heading, a compass, a support adapted for rotative movement about the axis of said compass for controlling the stylus operating instrumentalities, a pair of spaced light-sensitive cells mounted on said support, a light source mounted on the support adjacent the compass and disposed between and shielded from said light-sensitive cells so as to prevent direct illumination thereof, a pair of angularly disposed substantially flat mirrors mounted atop said compass, said mirrors being assembled to converge along a substantially horizontal line, said light source being constructed and arranged to direct light rays on said mirrors, and means controlled by the light reflected from said mirrors on said light-sensitive cells for rotating said support about the axis of said compass in a direction and degree opposite to and compensating for the deviation of the moving vehicle from the compass heading.

3. An apparatus for plotting the course and distance traveled by a moving vehicle comprising stylus-operating instrumentalities, an odometer shaft adapted to drive said stylus-operating instrumentalities at variable speeds, a pair of aligned step-gears interposed between said odometer shaft and said stylus-operating instrumentalities, pick-up means engaging the step-gears and operable to transmit motion from the latter to said stylus-operating instrumentalities, Scotch-yoke mechanism for moving said pick-up means parallel to the axis of the aligned step-gears and into positions which are operatively proportional to the sine or cosine of the angle of deviation of the moving vehicle from the compass heading, a compass, and light controlled means associated with said compass operable by the deviation of the moving vehicle from the compass heading for actuating the Scotch-yoke mechanism to effect the aforesaid displacement of said pick-up means.

4. An apparatus for plotting the course and distance traveled by a moving vehicle comprising stylus-operating instrumentalities, an odometer shaft adapted to drive said stylus-operating instrumentalities at variable speeds, a pair of aligned step-gears interposed between said odometer shaft and said stylus-operating instrumentalities, pick-up means engaging the step-gears and operable to transmit motion from the latter to said stylus-operating instrumentalities, Scotch-yoke mechanism for moving said pick-up means parallel to the axis of the aligned step-gears and into positions which are operatively proportional to the sine or cosine of the angle of deviation of the moving vehicle from the compass heading, a compass for controlling the stylus operating instrumentalities, a support adapted for rotative movement about the axis of said compass, a light source mounted on the support adjacent the compass and a light-sensitive cell mounted on said support, means for shielding the cell to prevent direct illumination of the cell from the light sources, means carried by said compass for reflecting light from said light source onto said light-sensitive cell, and means controlled by the reflected light on said light-sensitive cell for rotating said support about the axis of said compass in a direction and degree opposite to and compensating for the deviation of the moving vehicle from the compass heading.

5. An apparatus for plotting the course and distance traveled by a moving vehicle comprising stylus-operating instrumentalities, an odometer shaft adapted to drive said stylus-operating instrumentalities at variable speeds, a pair of aligned step-gears interposed between said odometer shaft and said stylus-operating instrumentalities, oppositely movable slidably mounted gears for transmitting motion from the step-gears to said stylus-operating instrumentalities, Scotch-yoke mechanism for moving said oppositely movable gears parallel to the axis of the aligned step-gears and into positions which are operatively proportional to the sine or cosine of the angle of deviation of the moving vehicle from a compass heading, a compass for controlling the stylus operating instrumentalities, a support adapted for rotative movement about the axis of said compass, a light source mounted on the support adjacent the compass and a light-sensitive cell mounted on said support, means for shielding the cell to prevent direct illumination of the cell from the light sources, means carried by said compass for reflecting light from said light source onto said light-sensitive cell, and means controlled by the reflected light on said light-sensitive cell for rotating said support about the axis of said compass in a direction and degree opposite to and compensating for the deviation of the moving vehicle from the compass heading.

6. Means for actuating the stylus-operating instrumentalities of apparatus for plotting the course and distance traveled by a moving vehicle comprising an odometer shaft adapted to drive said stylus-operating instrumentalities at variable speeds, a pair of aligned step-gears interposed between said odometer shaft and said stylus-operating instrumentalities, pick-up means engaging the step-gears and operable to transmit motion from the latter to said stylus-operating instrumentalities, Scotch-yoke mechanism for moving said pick-up means parallel to the axis of the aligned step-gears and into positions which are operatively proportional to the sine or cosine of the angle of deviation of the moving vehicle from the compass heading, a compass, and means operable by the deviation of the moving vehicle from the compass heading for actuating the Scotch-yoke mechanism to effect the aforesaid displacement of said pick-up means.

7. Means for actuating the stylus-operating instrumentalities of apparatus for plotting the course and distance traveled by a moving vehicle comprising an odometer shaft adapted to drive said stylus-operating instrumentalities at variable speeds, a pair of aligned step-gears interposed between said odometer shaft and said stylus-operating instrumentalities, pick-up means engaging the step-gears and operable to transmit motion from the latter to said stylus-operating instrumentalities, Scotch-yoke mechanism for moving said pick-up means parallel to the axis of the aligned step-gears and into positions which are operatively proportional to the sine or cosine of the angle of deviation of the moving vehicle from the compass heading, and a compass control assembly comprising a magnetic compass, a light reflecting surface attached thereto, a source of light capable of illuminating said light reflecting surface, a light sensitive cell capable of being activated by the said reflected light, and means operably interconnecting said light-sensitive cell and the said Scotch-yoke mechanism to effect the aforesaid displacement of said pick-up means responsive to the deviation of the moving vehicle from the compass heading.

ALVIN G. McNISH.
BRYANT TUCKERMAN.

REFERENCES CITED

The following references are of record in the file of this patent:

UNITED STATES PATENTS

| Number | Name | Date |
| --- | --- | --- |
| 1,711,791 | Kambo | May 7, 1929 |
| 1,818,103 | Sperry | Aug. 11, 1931 |
| 1,829,594 | Hugershoff | Oct. 27, 1931 |
| 2,136,944 | Hart | Nov. 15, 1938 |
| 2,325,365 | Britten | July 27, 1943 |
| 2,364,908 | Miller | Dec. 12, 1944 |

FOREIGN PATENTS

| Number | Country | Date |
| --- | --- | --- |
| 10,074 | Great Britain | Apr. 25, 1910 |
| 475,231 | France | Feb. 9, 1915 |